(12) United States Patent
Ibrahim et al.

(10) Patent No.: US 8,190,388 B2
(45) Date of Patent: *May 29, 2012

(54) METHOD AND SYSTEM FOR DETECTING BLUETOOTH SIGNALS UTILIZING A WIDEBAND RECEIVER

(75) Inventors: Brima Babatunde Ibrahim, Aliso Viejo, CA (US); Steven Deane Hall, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,170

(22) Filed: Oct. 26, 2009

(65) Prior Publication Data
US 2010/0048136 A1 Feb. 25, 2010

Related U.S. Application Data

(63) Continuation of application No. 11/927,853, filed on Oct. 30, 2007, now Pat. No. 7,640,123.

(51) Int. Cl.
*G01R 23/00* (2006.01)
(52) U.S. Cl. .............................. 702/77; 702/66; 702/81
(58) Field of Classification Search .................... 702/66, 702/77, 81; 475/132, 332, 337; 455/67.11, 455/226.1; 370/342
See application file for complete search history.

(56) References Cited

U.S. PATENT DOCUMENTS

| | | | |
|---|---|---|---|
| 6,760,671 B1 | 7/2004 | Batcher et al. | |
| 7,035,593 B2 * | 4/2006 | Miller et al. | ............... 455/67.11 |
| 7,640,123 B2 * | 12/2009 | Ibrahim et al. | ................. 702/77 |
| 2004/0137849 A1 | 7/2004 | Kloper et al. | |
| 2006/0128311 A1 | 6/2006 | Tesfai | |

FOREIGN PATENT DOCUMENTS

| | | |
|---|---|---|
| KR | 1020070018084 | 2/2007 |
| WO | WO2007092819 | 8/2007 |

OTHER PUBLICATIONS

JP Lynch, Bluetooth Transmission Technology. The dream for true seamless . . . , 2002, VT Edu., pp. 6-21.*
Golmie et al., 'Interference in the 2.4 GHz ISM Band: Impact on the Bluetooth Access Control Performance', 2001, IEEE Publication, pp. 1-6.*
Eruopean Search Report corresponding to European Patent Application Serial No. 08018336.1-2411, mailed May 19, 2009.
Fokke Hoeksema, et al., "A Node Architecture for Disaster Relief Networking," Department of Electrical Engineering, Mathematics and Computer Science (EEMCS) Signals and Systems Group, University of Twente, The Netherlands, 2005, pp. 577-584.

* cited by examiner

*Primary Examiner* — Michael Nghiem
*Assistant Examiner* — Elias Desta
(74) *Attorney, Agent, or Firm* — Thomas, Kayden & Horstemeyer & Risley, LLP.

(57) ABSTRACT

Aspects of a method and system for detecting Bluetooth signals utilizing a wideband receiver are provided. In this regard, a portion of a frequency band may be scanned multiple times, where each scan comprises receiving signals present in the scanned portion of the frequency band. Based on results of a Fast Fourier Transform performed on the received signals, presence of one or more Bluetooth transmissions in the received signals may be detected. In instances that a Bluetooth transmission is detected, a type of the Bluetooth transmission may be determined based on a number of the scans in which the Bluetooth transmission was detected. In instances that a detected Bluetooth transmission is a page, a Bluetooth transceiver in the wireless communication device may be powered up and/or enter a page scanning mode. The scans may be performed by a wireless local area networking receiver within the wireless communication device.

19 Claims, 5 Drawing Sheets

METHOD AND SYSTEM FOR DETECTING BLUETOOTH SIGNALS UTILIZING A WIDEBAND RECEIVER

CROSS-REFERENCE TO RELATED APPLICATIONS/INCORPORATION BY REFERENCE

This application is a continuation of U.S. patent application Ser. No. 11/927,853 filed on Oct. 30, 2007, now U.S. Pat. No. 7,640,123.

The above stated application is hereby incorporated herein by reference in its entirety.

FIELD OF THE INVENTION

Certain embodiments of the invention relate to wireless communications. More specifically, certain embodiments of the invention relate to a method and system for detecting Bluetooth signals utilizing a wideband receiver.

BACKGROUND OF THE INVENTION

The wireless communications industry has seen explosive growth in recent years and shows no signs of slowing. For example, Bluetooth and WLAN are technologies that are seeing widespread growth in terms of both numbers and types of compatible devices.

Bluetooth and WLAN both operate on the unlicensed 2.4 GHz ISM frequency band. Consequently, there are many coexistence issues that confront Bluetooth and WLAN system designers. For example, Bluetooth and WLAN networks operated in close proximity may interfere with each other. In this regard, although Bluetooth and WLAN utilize spread spectrum techniques to help mitigate the impact of multiple network in close proximity, the performance of Bluetooth and WLAN networks operating in close proximity may nonetheless be degraded. Accordingly, significant opportunities may exist for improving coexistence of Bluetooth and WLAN, and even for benefiting from Bluetooth and WLAN coexistence.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for detecting Bluetooth signals utilizing a wideband receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting Bluetooth signals utilizing a wideband receiver. In this regard, a frequency band may be scanned by receiving signals on each of a plurality of sub-bands for an amount of time, the energy received in each band may be compared to a threshold, and whether each sub-band comprises a Bluetooth transmission may be determined based on a Fast Fourier Transform (FFT). Additionally, the FFT may enable determining on which Bluetooth channel a detected transmission occurred. A FFT may be performed when energy detected in a sub-band is higher than a threshold. The sub-bands may each be a WLAN channel. A type of a detected Bluetooth transmission may be determined based on a number of scans in which the transmission is detected. The ISM frequency ban may be scanned in less than or equal to 68 μs and each sub-band may be received for less than or equal to 68 μs divided by the number of sub-bands.

Figure 1:
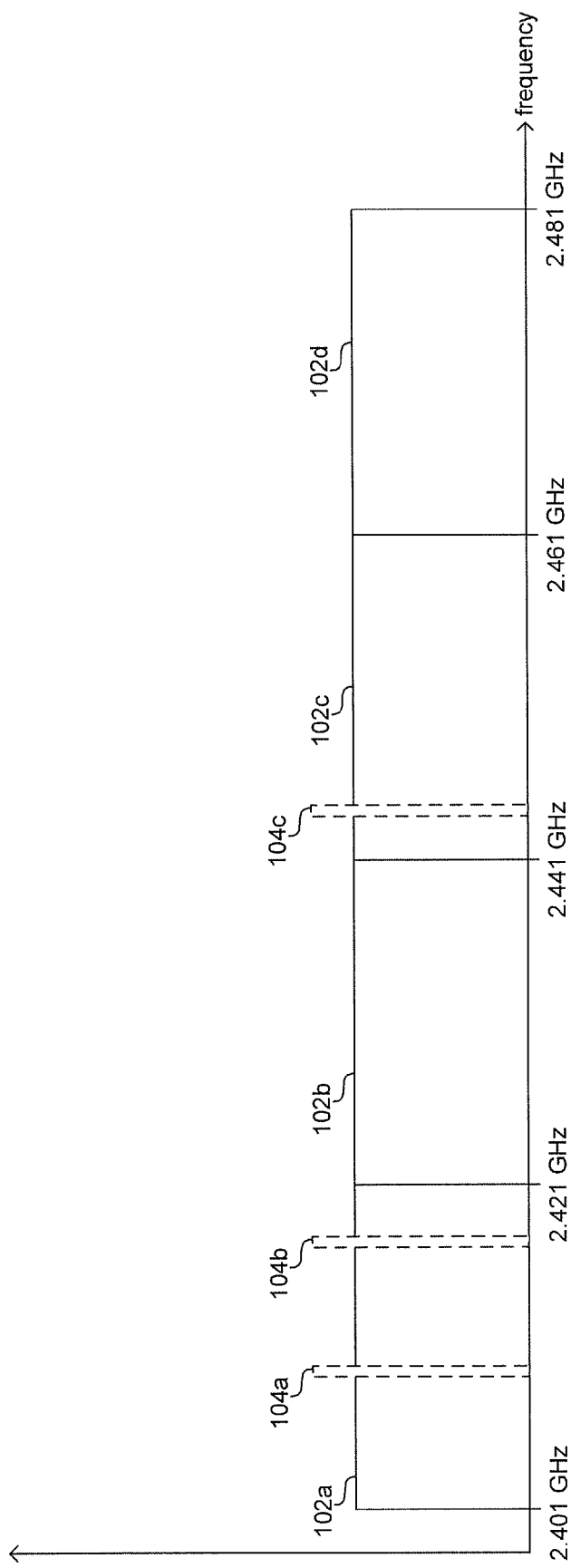
FIG. 1 is a diagram illustrating detection of Bluetooth signals utilizing a wideband receiver, in accordance with an embodiment of the invention.

FIG. 1 is a diagram illustrating detection of Bluetooth signals utilizing a wideband receiver, in accordance with an embodiment of the invention. Referring to FIG. 1 there is shown the 2.4 GHz ISM frequency band split into four 20 MHz wide sub-bands 102a, 102b, 102c, and 102d.

The 2.4 GHz ISM frequency band may extend from 2.401 GHz to 2.483 GHz. Bluetooth may utilize the 2.4 GHz ISM frequency band as described below with respect to FIG. 4a. The four sub-bands 102a, 102b, 102c, and 102d may collectively cover the 79 Bluetooth channels. In the exemplary embodiment of the invention depicted, the sub-bands may each cover approximately 20 MHz, however, sub-bands may cover any bandwidth without deviating from the scope of the invention. For example, three sub-bands of approximately 40 MHz sub-bands may be used.

In operation, a wideband receiver may scan the four sub-bands and measure the received signal strength in each of the four sub-bands. If the received signal strength is greater than a threshold, then a FFT may be performed on the received data. In this regard, a wideband receiver may receive on each of the sub-bands, for a period of time, and may store the received data. A FFT may then be performed on the received data to determine the content of the received signal. Accordingly, if the FFT results in a narrow band of relatively high energy it may be determined that a Bluetooth signal is present in the sub-band. For example, with regard to FIG. 1, the energy in the sub-bands 102a and 102c may be above the threshold and thus a FFT may be performed on the data stored while scanning sub-bands 102a and 102c. In this manner, the FFT of the data stored while receiving sub-band 102a may result in two energy spikes and thus aspects of the invention may enable detecting that Bluetooth transmission 104a and 104b in the sub-band 102a. Similarly, the FFT of the data stored while receiving the sub-band 102c may enable detection of the Bluetooth transmission 104c in the sub-band 102c.

Furthermore, aspects of the invention may enable determining where in the sub-band the energy is located, and thus may enable determining the Bluetooth channel on which the detected energy is being transmitted.

As described below with respect to FIG. 4b, the shortest Bluetooth packet may be a page/inquiry packet (also referred to as an 'ID' packet) which may be 68 μs in duration. Accordingly, in order to detect even the shortest duration Bluetooth transmissions, the four sub-bands 102a, 102b, 102c, 102d may need to be scanned in 68 μs. Thus, in one embodiment of the invention, each sub-band may be scanned for 17 μs. However, aspects of the invention may enable obtaining a sufficiently accurate FFT result with fewer samples than may be received in 17 μs. In this manner, significant power savings may be achieved since the receiver may be in a low(er) power state during periods of time between scans.

In an exemplary embodiment of the invention, each sub-band may be scanned for approximately 2 μs, resulting in a scan of the entire 2.4 GHz ISM band being completed in approximately 8 μs. Accordingly, aspects of the invention may enable comparing results of different scans in order to obtain additional information about the Bluetooth transmissions. For example, the number of consecutive scans in which a particular Bluetooth transmission is detected may be utilized to determine additional information about that Bluetooth transmission. For instance, in instances where a Bluetooth transmission is not present during a first scan, present during the next 8 scans, and then again not present during a $9^{th}$ scan, then it may be determined that the Bluetooth transmission may not comprise an ID packet. Similarly, in instances where a transmission may be present for more than 8 consecutive scans, then it may be determined that the transmission may not comprise an ID packet. In this regard, a co-located Bluetooth receiver may be prevented from needlessly powering up or attempting to enter a connection mode when a detected Bluetooth transmission is not a page or inquiry (ID packet).

In an exemplary embodiment of the invention, a WLAN receiver may be utilized for scanning the 2.4 GHz ISM frequency band. Accordingly, the sub-bands may correspond to WLAN channels. For example, in a North American implementation the four sub-bands 102a, 102b, 102c, and 102d may comprise WLAN channels 1 (2401-2423 MHz), 4 (2416-2438), 8 (2436-2458), and 11 (2451-2473).

Figure 2:
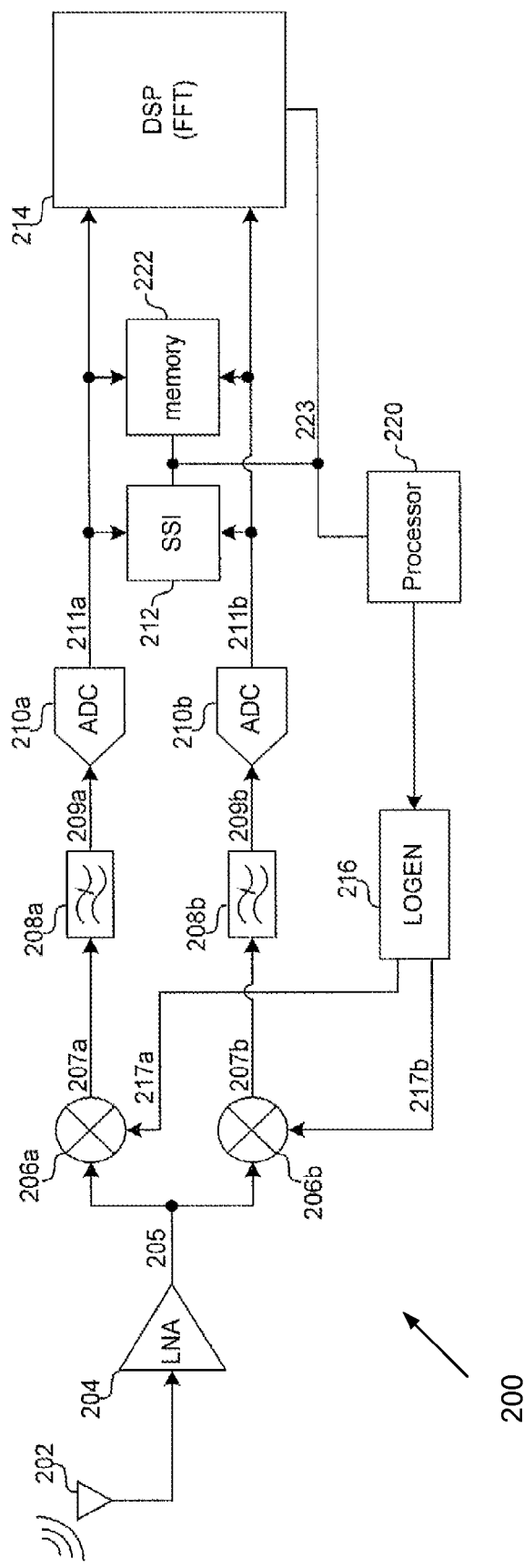
FIG. 2 is a block diagram of an exemplary wideband receiver enabled to detect Bluetooth signals, in accordance with an embodiment of the invention.

FIG. 2 is a block diagram of an exemplary wideband receiver enabled to detect Bluetooth signals, in accordance with an embodiment of the invention. Referring to FIG. 2 there is shown an exemplary wideband receiver 200 comprising an antenna 202, a low noise amplifier (LNA) 204, mixers 206a and 206b, filters 208a and 208b, analog to digital converters (ADC) 210a and 210b, signal strength indicator 212, digital signal processor 214, a local oscillator generator (LOGEN) 216, processor 220, and memory 222.

Figure 5:
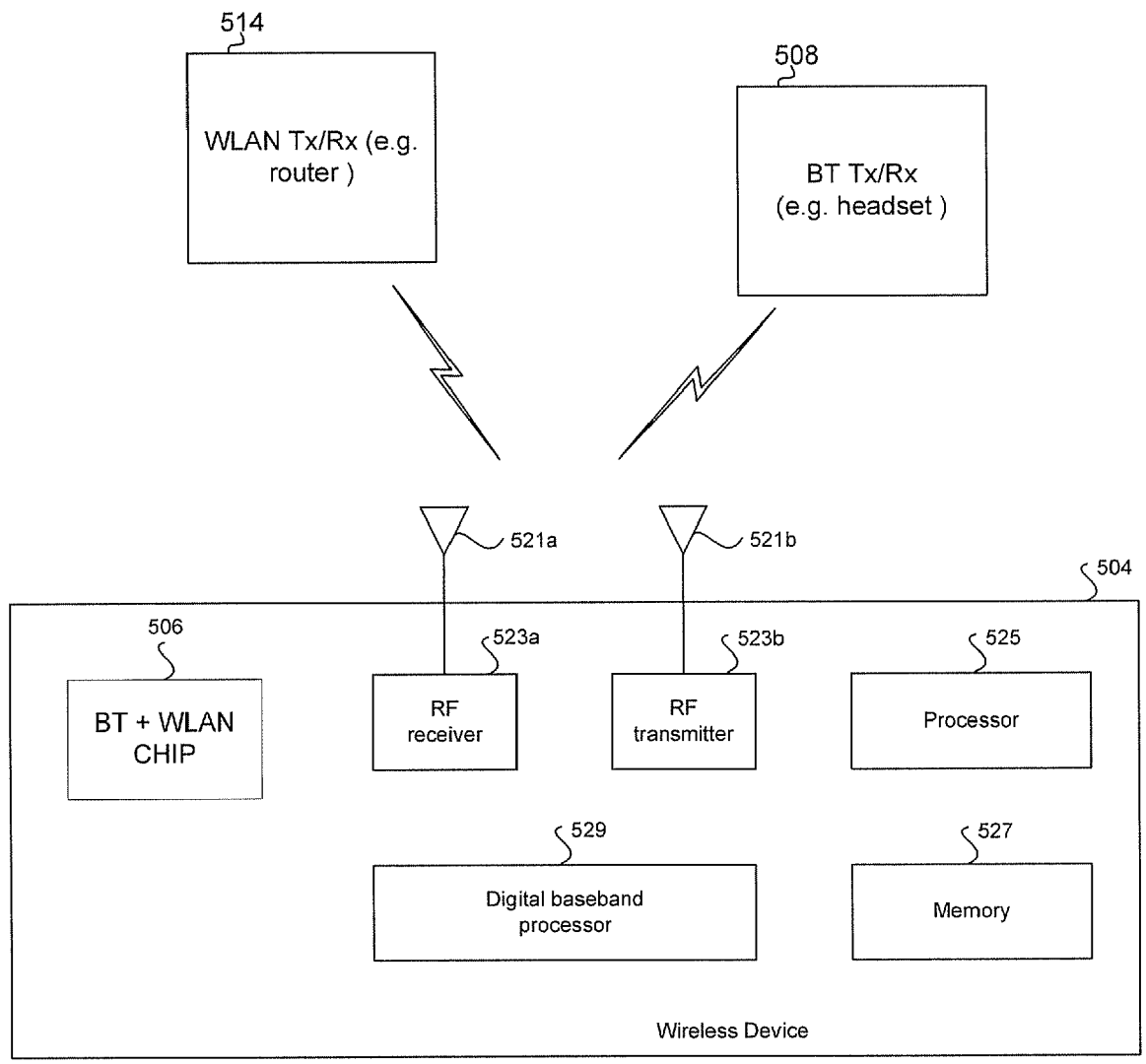
FIG. 5 is a block diagram illustrating an exemplary wireless device, in accordance with an embodiment of the invention.

The antenna 202 may comprise suitable logic, circuitry, and/or code for receiving signals from Bluetooth and/or Wideband transceivers, such as the transceivers 508 and 514 described with respect to FIG. 5. In various embodiments of the invention there may be multiple antennas.

The LNA 204 may comprise suitable logic, circuitry, and/ or code that may enable buffering and/or amplification of received RF signals. In this regard, the gain of the LNA 204 may be adjustable to enable reception of signals of varying strength. Accordingly, the LNA 204 may, for example, receive one or more control signals from the processor 220.

Each of the mixers 206a and 206b may comprise suitable logic, circuitry, and/or code that may enable generation of inter-modulation products resulting from mixing signal 205 and the local oscillator signals 217a and 217b. In this manner, received signals may be down-converted to phase-quadrature baseband signals 207a and 207b.

The Filters 208a and 208b may each comprise suitable logic, circuitry, and/or code for attenuating undesired frequencies to a greater extent than desired frequencies. In this regard, the filters 208a and 208b may, for example, have low pass or bandpass characteristics. In this manner, the filters may be enabled to reject undesired inter-modulation products output by the mixers 206a and 206b while passing desired inter-modulation products.

The ADCs 210a and 210b may each comprise suitable logic, circuitry, and/or code that may enable conversion of analog signals to a digital representation. In this regard, the ADCs 210a and 210b may, for example, sample and quantize analog signal 209a and 209b, respectively, at times specified by a sample clock. Accordingly, the ADCs 210a and 210b may receive one or more control signals from, for example, the processor 220 or the local oscillator generator 216.

The SSI 212 may comprise suitable logic, circuitry, and/or code that may enable determining signal strength. In this regard, the SSI 212 may, for example, be enabled to measure current, voltage and/or power of the signals 211a and 211b. Additionally, the SSI 212 may be enabled to convey measurement results to the processor 220 and/or the memory 222. In various embodiments of the invention, the SSI 212 may output, via the bus 223, one or more digital and/or analog signals representative of the current, voltage and/or power of the signals 211a and 211b. The SSI 212 may receive one or more control signals from the processor 220.

The digital signal processor (DSP) 214 may comprise suitable logic, circuitry, and/or code that may enable FFT analysis of received data. In this regard, the DSP 214 may perform FFT analysis of data stored in the memory 222. In various embodiments of the invention, the DSP 214 may receive one or more control signals from the processor 220. In other embodiments of the invention, the DSP 214 may be a functional block of the processor 220.

The LO generator 216 may comprise suitable logic, circuitry, and/or code that may enable generation of at least a pair of phase-quadrature local oscillator signals. For example, the LOGEN 216 may comprise a voltage controlled oscillator for generating a LO frequency and a phase splitter for generating a pair of phase quadrature signals. In various other embodiments of the invention, the LOGEN 216 may comprise a direct digital frequency synthesizer. The LOGEN 216 may receive one or more control signals from the processor 220.

The processor 220 may comprise suitable circuitry, logic, and/or code that may enable interfacing to the low noise amplifier (LNA) 204, mixers 206a and 206b, filters 208a and 208b, analog to digital converters (ADC) 210a and 210b, signal strength indicator 212, digital signal processor 214, local oscillator generator (LOGEN) 216, and memory 222. In this regard, the processor 220 may be enabled to execute one or more instructions that enable reading and/or writing to/from the memory 222. Also, the processor 220 may be enabled to execute one or more instructions that enable providing one or more control signals to the low noise amplifier (LNA) 204, mixers 206a and 206b, filters 208a and 208b, analog to digital converters (ADC) 210a and 210b, signal strength indicator 212, digital signal processor 214, a local oscillator generator (LOGEN) 216. Additionally, the processor 220 may be enabled to control the transfer of data to/from the various components of the wideband receiver 200. For example, the processor 220 may control data transfers between the SSI 212, the memory 222, and the DSP 214 via the bus 223.

The memory 222 may comprise suitable circuitry, logic, and/or code that may enable storage of information. In this regard, the memory 222 may, for example, enable storage of information utilized to control and/or configure the low noise amplifier (LNA) 204, mixers 206a and 206b, filters 208a and 208b, analog to digital converters (ADC) 210a and 210b, signal strength indicator 212, digital signal processor 214, a local oscillator generator (LOGEN) 216. The memory 222 may store received data such that an FFT may be performed on received, stored data. In an exemplary embodiment of the invention, the memory 222 may be enabled to store received data from each sub-band and may be enabled store up to 68 μs of received data. Additionally, the memory 222 may be enabled to store measurement results from the SSI 212. In various embodiments of the invention, the memory 222 may be enabled to store one or more data structures which enable determining a Bluetooth hopping sequence. In this manner, in instances where a Bluetooth transmission may be detected on a channel, the data structure may be referenced to determine the next Bluetooth channel for transmission.

In an exemplary operation, the wideband receiver 200 may be co-located with a Bluetooth transceiver. In this regard, the Bluetooth transceiver and the Bluetooth receiver may be integrated into a single chip, such as the chip 506 of FIG. 5. The wideband receiver 200 may be tuned to one of the sub-bands 102a, 102b, 102c, or 102d. In this regard, the processor 220 may provide control signals to, for example, the LOGEN 216, and the filters 208a and 208b to tune the wideband receiver to a desired sub-band. Received signals may be received via the antenna 202 and amplified by the LNA 204. The received signals may be mixed with in-phase and quadrature-phase LO signals from the LOGEN 216 to down-convert the received signal to in-phase and quadrature-phase baseband signals 209a and 209b. The baseband signals 209a and 209b may be digitized by the ADCs 210a and 210b. The digitized signals 211a and 211b may be stored in the memory 222, and the SSI 212 may compare the energy in the digitized signals to a threshold. In instances where the energy in the digitized signal may be less than the threshold, it may be determined that no Bluetooth signals are present in the sub-band. However, in instances where the energy in the digitized signals may be greater than the threshold, then the DSP 214 may perform a FFT analysis of the stored data. Accordingly, the results of the FFT may enable determining if the energy is indicative of a Bluetooth signal. Additionally, in instances where a Bluetooth signal may be detected, aspects of the invention may enable determining the Bluetooth channel on which the detected transmission occurred. Furthermore, in instances where the Bluetooth channel may be detected, exemplary aspects of the invention may enable referencing a data structure in the memory 222 which may indicate a next Bluetooth channel on which data may be transmitted.

In an exemplary embodiment of the invention, the wideband receiver 200 may comprise a WLAN or "Wi-Fi" receiver. In this regard, the wideband receiver 200 may be enabled to adhere to one or more IEEE 802.11 standards. For example, a WLAN standard may utilize 20 MHz wide or 40 MHz wide channels, and accordingly one or more non-overlapping WLAN channels (e.g. channels 1, 4, 8, and 11) may be utilized as the sub-bands. Accordingly, a Bluetooth transceiver and a wideband receiver may be co-located, such as in the chip 506 as described with respect to FIG. 5.

Figure 3:
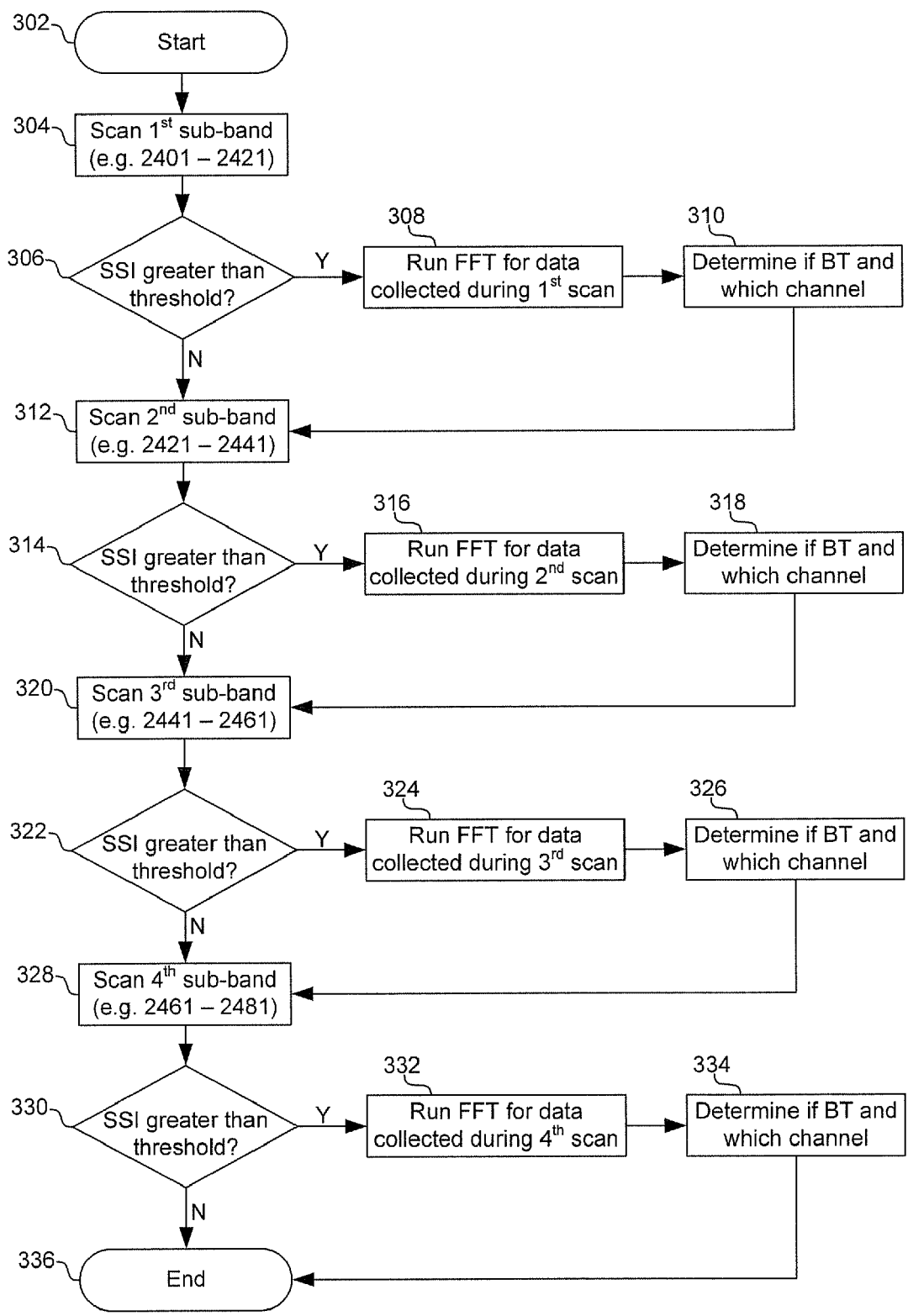
FIG. 3 is a flow chart illustrating exemplary steps for utilizing a wideband receiver to detect Bluetooth signals, in accordance with an embodiment of the invention.

FIG. 3 is a flow chart illustrating exemplary steps for utilizing a wideband receiver to detect Bluetooth signals, in accordance with an embodiment of the invention. Referring to FIG. 3 the exemplary steps may begin with start step 302. Subsequent to step 302, the exemplary steps may advance to step 304. In step 304, the wideband receiver 200 may tune to a first sub-band (e.g., 2401-2421 MHz) and store data received on the first sub-band for a determined period of time (e.g. 2 μs). Subsequent to step 304, the exemplary steps may advance to step 306. In step 306 it may be determined whether the received signal energy in the first sub-band is greater than a threshold. If the received energy is greater than the threshold, then the exemplary steps may advance to step 308. In step 308, FFT analysis may be performed on the data received in the first sub-band. Subsequent to step 308 the exemplary steps may advance to step 310. In step 310, the results of the FFT analysis may be utilized to determine whether the signal energy present in the first sub-band may be a Bluetooth transmission. Additionally, in instances where a Bluetooth transmission may be detected in the first sub-band, the Bluetooth channel on which the transmission occurred may be determined. Furthermore, in instances that a Bluetooth transmission is detected, a co-located Bluetooth receiver may enter a page scanning or connection mode. In this regard, in various embodiments of the invention, a co-located Bluetooth receiver may enter a page scanning or connection mode when a detected Bluetooth transmission is determined to be an ID packet. Subsequent to step 310, the exemplary steps may advance to step 312.

Returning to step 306, in instances where the energy received in the first sub-band may be below the threshold, then the exemplary steps may advance to step 312.

In step 312, the wideband receiver 200 may tune to a second sub-band (e.g., 2421-2441 MHz) and store data received in the second sub-band for a determined period of time (e.g. 2 μs). Subsequent to step 312, the exemplary steps may advance to step 314. In step 314 it may be determined whether the received signal energy in the second sub-band is greater than a threshold. If the received energy is greater than the threshold, then the exemplary steps may advance to step 316. In step 316, FFT analysis may be performed on the data received on the second sub-band. Subsequent to step 316 the exemplary steps may advance to step 318. In step 318, the results of the FFT analysis may be utilized to determine whether the signal energy present in the second sub-band may be a Bluetooth transmission. Additionally, in instances where a Bluetooth transmission may be detected in the second sub-band, the Bluetooth channel on which the transmission occurred may be determined. Furthermore, in instances that a Bluetooth transmission is detected, a co-located Bluetooth receiver may enter a page scanning or connection mode. In this regard, in various embodiments of the invention, a co-located Bluetooth receiver may enter a page scanning or connection mode when a detected Bluetooth transmission is determined to be an ID packet. Subsequent to step 318, the exemplary steps may advance to step 320.

Returning to step 314, in instances where the energy received in the second sub-band may be below the threshold, then the exemplary steps may advance to step 320.

In step 320 the wideband receiver 200 may tune to a third sub-band (e.g 2441-2461 MHz) and store data received in the third sub-band for a determined period of time (e.g. 2 μs). Subsequent to step 320, the exemplary steps may advance to step 322. In step 322 it may be determined whether the received signal energy in the third sub-band is greater than a threshold. In instances where the received energy may be greater than the threshold, then the exemplary steps may advance to step 324. In step 324, FFT analysis may be performed on the data received on the third sub-band. Subsequent to step 324 the exemplary steps may advance to step 326. In step 326, the results of the FFT analysis may be utilized to determine if the signal energy present in the third sub-band may be a Bluetooth transmission. Additionally, in instances where a Bluetooth transmission may be detected in the third sub-band, the Bluetooth channel on which the transmission occurred may be determined. Furthermore, in instances that a Bluetooth transmission is detected, a co-located Bluetooth receiver may enter a page scanning or connection mode. In this regard, in various embodiments of the invention, a co-located Bluetooth receiver may enter a page scanning or connection mode when a detected Bluetooth transmission is determined to be an ID packet. Subsequent to step 326, the exemplary steps may advance to step 328.

Returning to step 322, if the energy received in the third sub-band is below the threshold, then the exemplary steps may advance to step 328.

In step 328 the wideband receiver 200 may tune to a fourth sub-band (e.g 2461-2481 MHz) and store data received on the fourth sub-band for a determined period of time (e.g. 2 μs). Subsequent to step 328, the exemplary steps may advance to step 330. In step 330 it may be determined whether the received signal energy in the fourth sub-band is greater than a threshold. In instances where the received energy maybe greater than the threshold, then the exemplary steps may advance to step 332. In step 332, FFT analysis may be performed on the data received on the fourth sub-band. Subsequent to step 332 the exemplary steps may advance to step 334. In step 334, the results of the FFT analysis may be utilized to determine whether the signal energy present in the fourth sub-band may be a Bluetooth transmission. Additionally, if a Bluetooth transmission is detected in the fourth sub-band, the Bluetooth channel on which the transmission occurred may be determined. Furthermore, in instances that a Bluetooth transmission is detected, a co-located Bluetooth receiver may enter a page scanning or connection mode. In this regard, in various embodiments of the invention, a co-located Bluetooth receiver may enter a page scanning or connection mode when a detected Bluetooth transmission is determined to be an ID packet. Subsequent to step 334, the exemplary steps may advance to step 336.

Returning to step 330, in instances where the energy received in the fourth sub-band may be below the threshold, then the exemplary steps may advance to step 336.

Figure 4A:
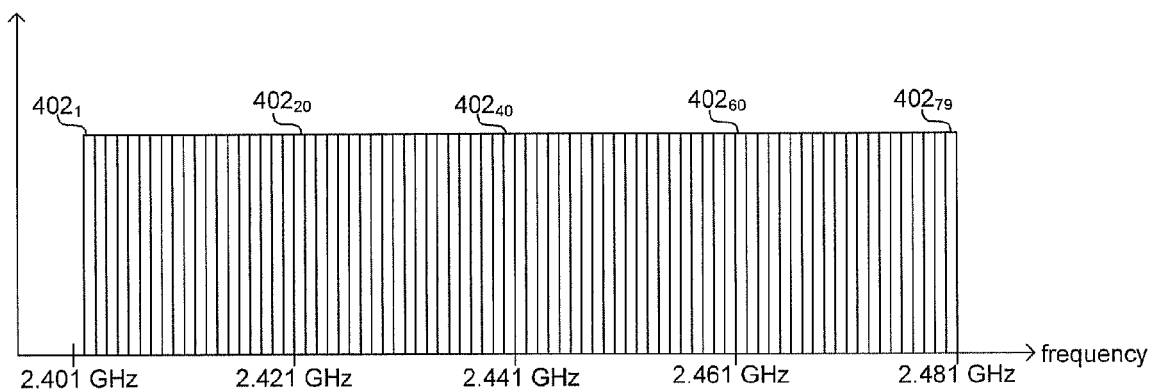
FIG. 4a is a diagram illustrating Bluetooth channels in exemplary frequency bands of a wideband receiver, in accordance with an embodiment of the invention.

FIG. 4a is a diagram illustrating Bluetooth channels in exemplary sub-bands, in accordance with an embodiment of the invention. Referring to FIG. 4a, there is shown the 79 Bluetooth channels between 2402 and 2481 MHz. In this regard the first 19 Bluetooth channels fall within the exemplary first sub-band of 2401 to 2421 MHz, Bluetooth channels 20 through 39 fall within the exemplary second sub-band of 2421 to 2441 MHz, Bluetooth channels 40 through 60 fall within the exemplary third sub-band of 2441 to 2461 MHz, and Bluetooth channels 60 through 79 fall within the exemplary fourth sub-band of 2461 to 2481 MHz. Accordingly, a sub-band in which a Bluetooth transmission is detected may aid in determining which Bluetooth channel(s) the transmission(s) occurred on.

Figure 4B:
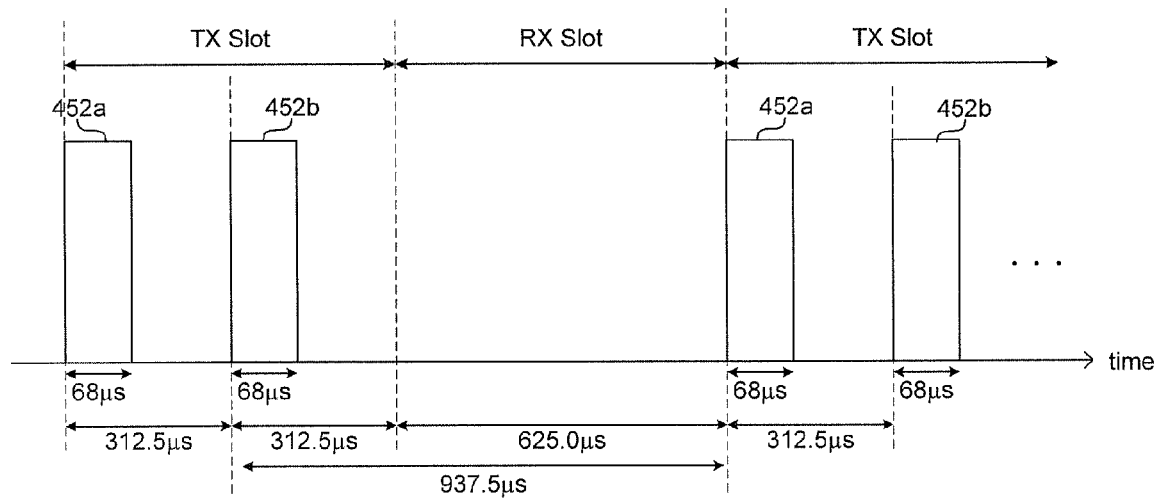
FIG. 4b is a diagram illustrating transmission of Bluetooth page/inquiry (ID) signals, in connection with an embodiment of the invention.

FIG. 4b is a diagram illustrating transmission of Bluetooth ID signals, in connection with an embodiment of the invention. Referring to FIG. 4b there is shown an exemplary series of Bluetooth ID packet transmissions. In this regard, ID packets may be the shortest duration Bluetooth transmissions and thus may be the most challenging to detect. As illustrated, ID packets 452a and 452b may be transmitted in pairs with each ID packet transmission 68 μs in duration, 380.5 μs for transmission of the pair, and 869.5 μs between pairs. FIG. 4b also illustrates that the shortest period of time to observe the channel and ensure the presence of an ID packet may be 937.5 μs. Accordingly, in order to detect the presence of Bluetooth communications, the entire 2.4 GHz ISM band may need to be scanned for at least 937.5 μs and scans may happen at least every 68 μs. In this regard, in an exemplary embodiment 14 scans may be required to reliably detect Bluetooth transmissions. In another embodiment of the invention, a scan may be performed every less than 68 μs, and if energy is detected, additional scans may be performed in succession.

FIG. 5 is a block diagram illustrating an exemplary wireless device, in accordance with an embodiment of the invention. Referring to FIG. 5 there is shown a wireless device 504, a WLAN transceiver 514, and a BT transceiver 508.

The WLAN transceiver 514 may, for example, transmit and receive signals adhering to a wireless standard such as the IEEE 802.11 family of standards. In this regard, the WLAN transceiver 514 may utilize orthogonal frequency division multiplexing (OFDM) and may operate on one of eleven 22 MHZ wide WLAN channels. The WLAN transceiver may be implemented as part of a wireless router and may operate in the 2.4 GHz ISM band.

The Bluetooth transceiver 508 may, for example, adhere to one or more Bluetooth standards transmitting and receiving RF signals at or near 2.4 GHz. In this regard, the Bluetooth transceiver 508 may utilize frequency hopping spread spectrum and may hop between the 79 1 MHz wide Bluetooth channels depicted in FIG. 4a. The Bluetooth transceiver 508 may be implemented as, for example, part of a wireless headset utilized to transfer voice and/or audio information to/from the smart phone 504.

The wireless device 504 may comprise an RF receiver 523a, an RF transmitter 523b, a digital baseband processor 529, a processor 525, and a memory 527. A receive antenna 521a may be communicatively coupled to the RF receiver 523a. A transmit antenna 521b may be communicatively coupled to the RF transmitter 523b.

The RF receiver 523a may comprise suitable logic, circuitry, and/or code that may enable processing of received RF signals. The RF receiver 523a may enable receiving RF signals in a plurality of frequency bands. For example, the RF receiver 523a may enable receiving signals in ISM frequency bands. Each frequency band supported by the RF receiver 523a may have a corresponding front-end circuit for handling low noise amplification and down conversion operations, for example. In this regard, the RF receiver 523a may be referred to as a multi-band receiver when it supports more than one frequency band. In another embodiment of the invention, the wireless device 504 may comprise more than one RF receiver 523a, wherein each of the RF receiver 523a may be a single-band or a multi-band receiver.

The RF receiver 523a may down convert the received RF signal to a baseband signal that comprises an in-phase (I) component and a quadrature (Q) component. The RF receiver 523a may perform direct down conversion of the received RF signal to a baseband signal, for example. In some instances, the RF receiver 523a may enable analog-to-digital conversion of the baseband signal components before transferring the components to the digital baseband processor 529. In other instances, the RF receiver 523a may transfer the baseband signal components in analog form.

The digital baseband processor 529 may comprise suitable logic, circuitry, and/or code that may enable processing and/or handling of baseband signals. In this regard, the digital baseband processor 529 may process or handle signals received from the RF receiver 523a and/or signals to be transferred to the RF transmitter 523b, when the RF transmitter 523b is present, for transmission to the network. The digital baseband processor 529 may also provide control and/or feedback information to the RF receiver 523a and to the RF transmitter 523b based on information from the processed signals. The digital baseband processor 529 may communicate information and/or data from the processed signals to the processor 525 and/or to the memory 527. Moreover, the digital baseband processor 529 may receive information from the processor 525 and/or to the memory 527, which may be processed and transferred to the RF transmitter 523b for transmission to the network.

The RF transmitter 523b may comprise suitable logic, circuitry, and/or code that may enable processing of RF signals for transmission. The RF transmitter 523b may enable transmission of RF signals in a plurality of frequency bands. For example, the RF transmitter 523b may enable transmitting signals in ISM frequency bands. Each frequency band supported by the RF transmitter 523b may have a corresponding front-end circuit for handling amplification and up conversion operations, for example. In this regard, the RF transmitter 523b may be referred to as a multi-band transmitter when it supports more than one frequency band. In another embodiment of the invention, the wireless device 520 may comprise more than one RF transmitter 523b, wherein each of the RF transmitter 523b may be a single-band or a multi-band transmitter.

The RF transmitter 523b may quadrature up convert the baseband signal comprising I/Q components to an RF signal. The RF transmitter 523b may perform direct up conversion of the baseband signal to a RF signal, for example. In some instances, the RF transmitter 523b may enable digital-to-analog conversion of the baseband signal components received from the digital baseband processor 529 before up conversion. In other instances, the RF transmitter 523b may receive baseband signal components in analog form.

The processor 525 may comprise suitable logic, circuitry, and/or code that may enable control and/or data processing operations for the wireless device 504. The processor 525 may be utilized to control at least a portion of the RF receiver 523a, the RF transmitter 523b, the digital baseband processor 529, and/or the memory 527. In this regard, the processor 525 may generate at least one signal for controlling operations within the wireless device 504. The processor 525 may also enable executing of applications that may be utilized by the wireless device 504. For example, the processor 525 may execute applications that may enable displaying and/or interacting with content received via cellular transmission signals in the wireless device 504.

The memory 527 may comprise suitable logic, circuitry, and/or code that may enable storage of data and/or other information utilized by the wireless device 504. For example, the memory 527 may be utilized for storing processed data generated by the digital baseband processor 529 and/or the processor 525. The memory 527 may also be utilized to store information, such as configuration information, that may be utilized to control the operation of at least one block in the wireless device 504. For example, the memory 527 may comprise information necessary to configure the RF receiver 523a to enable receiving cellular transmission in the appropriate frequency band.

The multi-function wireless chip 506 may comprise suitable logic, circuitry, and/or code that may enable the smart phone to communicate with the WLAN transceiver 514 and the BT transceiver 508. The chip 506 may be enabled to transmit and/or receive Bluetooth signals and WLAN signals. Accordingly, the chip 506 may utilize advanced and/or specialized signal processing techniques in order to minimize interference between the various wireless technologies. For example, the chip 506 may comprise suitable logic, circuitry, and/or code that may be enable utilization of a Fast Fourier transform (FFT) for processing received OFDM signals.

Aspects of a method and system for detecting Bluetooth signals utilizing a wideband receiver are provided. In this regard, a frequency band, such as the 2.4 GHz ISM frequency band depicted in FIG. 1, may be scanned by receiving signals on each of a plurality of sub-bands 102 (FIG. 1) for an amount of time, the energy received in each band may be compared to a threshold, and whether each sub-band comprises a Bluetooth transmission 104 (FIG. 1) may be determined based on a FFT. Additionally, the FFT may enable determining which Bluetooth channel 402 (FIG. 4a) a detected transmission occurred on. A FFT may be performed when energy detected in a sub-band 102 (FIG. 1) is higher than a threshold. The sub-bands may each be a WLAN channel. A type of a detected Bluetooth transmission may be determined based on a number of scans in which the transmission is detected. The ISM frequency band (e.g. 2.4 GHz), may be scanned in less than or equal to 68 µs and each sub-band (e.g sub-bands 102a, 102b, 102c, and 102d of FIG. 1) may be received for less than or equal to 68 µs divided by the number of sub-bands.

Another embodiment of the invention may provide a machine-readable storage, having stored thereon, a computer program having at least one code section executable by a machine, thereby causing the machine to perform the steps as described herein for detecting Bluetooth signals utilizing a wideband receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
performing by one or more processors and/or circuits in a wireless communication device:
scanning a portion of a frequency band to receive signals present within said portion of said frequency band;
detecting one or more Bluetooth transmission in said received signals based on results of a Fast Fourier Transform performed on said received signals;
determining a type of said one or more detected Bluetooth transmission based on a number of times in which said one or more Bluetooth transmission was detected; and
powering up a Bluetooth transmitter and/or receiver in said wireless communication device when said determined type of said one or more detected Bluetooth transmission is a page.

2. The method according to claim 1, wherein said portion of said frequency band is a wireless local area networking channel.

3. The method according to claim 1, comprising determining a Bluetooth channel associated with one or more detected Bluetooth transmission based on said results of said Fast Fourier Transform.

4. The method according to claim 1, comprising performing said Fast Fourier Transform when said energy of said received signals is greater than a threshold.

5. The method according to claim 1, comprising triggering a Bluetooth transmitter and/or receiver in said wireless communication device to enter a connection mode or page scanning mode when said determined type of said one or more detected Bluetooth transmission is a page.

6. The method according to claim 1, wherein said scanning is performed by a wireless local area networking receiver within said wireless communication device.

7. The method according to claim 6, wherein said wireless local area networking receiver is compliant with the IEEE 802.11 family of standards.

8. The method according to claim 1, comprising scanning said portion of said frequency band periodically.

9. The method according to claim 1, comprising scanning another portion of said frequency band during one or more pauses in said scanning.

10. A system for wireless communication, the system comprising:
one or more circuits and/or processors for use in a wireless communication device, wherein said one or more circuits and/or processors are operable to:
scan a portion of a frequency band to receive signals present within said portion of said frequency band;
detect one or more Bluetooth transmission in said received signals based on results of a Fast Fourier Transform performed on said received signals;
determine a type of said one or more detected Bluetooth transmission based on a number of times in which said one or more Bluetooth transmission was detected; and
power up a Bluetooth transmitter and/or receiver in said wireless communication device when said determined type of said one or more detected Bluetooth transmission is a page.

11. The system according to claim 10, wherein said portion of said frequency band is a wireless local area networking channel.

12. The system according to claim 10, wherein said one or more circuits and/or processors are operable to determine a Bluetooth channel associated with one or more detected Bluetooth transmission based on said results of said Fast Fourier Transform.

13. The system according to claim 10, wherein said one or more circuits and/or processors are operable to perform said Fast Fourier Transform when said energy of said received signals received in said one of said plurality of sub-bands is greater than a threshold.

14. The system according to claim 10, wherein said one or more circuits and/or processors are operable to triggering a Bluetooth transmitter and/or receiver in said wireless communication device to enter a connection mode or page scanning mode upon determining that said Bluetooth transmission was a page.

15. The system according to claim 10, wherein said scanning is performed by a wireless local area networking receiver within said wireless communication device.

16. The system according to claim 15, wherein said wireless local area networking receiver is compliant the IEEE 802.11 family of standards.

17. The system according to claim 10, wherein said one or more circuits and/or processors are operable to scan said portion of said frequency band periodically.

18. The system according to claim 10, wherein said one or more circuits and/or processors are operable to scan one or more other portions of said frequency band during one or more pauses in said scan of said portion of said frequency band.

19. A system for wireless communication, the system comprising:
one or more circuits and/or processors for use in a wireless communication device, wherein said one or more circuits and/or processors are operable to:
scan a portion of a frequency band to receive signals present within said portion of said frequency band;
detect one or more Bluetooth transmission in said received signals based on results of a Fast Fourier Transform performed on said received signals, said Fast Fourier Transform performed when energy of said received signals received in one of a plurality of sub-bands is greater than a threshold; and
determine a type of said one or more detected Bluetooth transmission based on a number of times in which said one or more Bluetooth transmission was detected.

* * * * *

UNITED STATES PATENT AND TRADEMARK OFFICE
CERTIFICATE OF CORRECTION

PATENT NO.         : 8,190,388 B2
APPLICATION NO.    : 12/606170
DATED              : May 29, 2012
INVENTOR(S)        : Ibrahim et al.

Page 1 of 1

It is certified that error appears in the above-identified patent and that said Letters Patent is hereby corrected as shown below:

Claim 14: Column 12, Line 19, please remove "triggering" and replace with --trigger--

Claim 16: Column 12, Line 28, please add "with" after the word --compliant--

Signed and Sealed this
Twentieth Day of November, 2012

David J. Kappos
*Director of the United States Patent and Trademark Office*